March 25, 1952     R. J. PRATT     2,590,270
COOKING VESSEL

Filed April 18, 1947     2 SHEETS—SHEET 1

ROBERT J. PRATT
INVENTOR.

BY Cecil L. Wood

ATTORNEY

March 25, 1952  R. J. PRATT  2,590,270
COOKING VESSEL
Filed April 18, 1947  2 SHEETS—SHEET 2
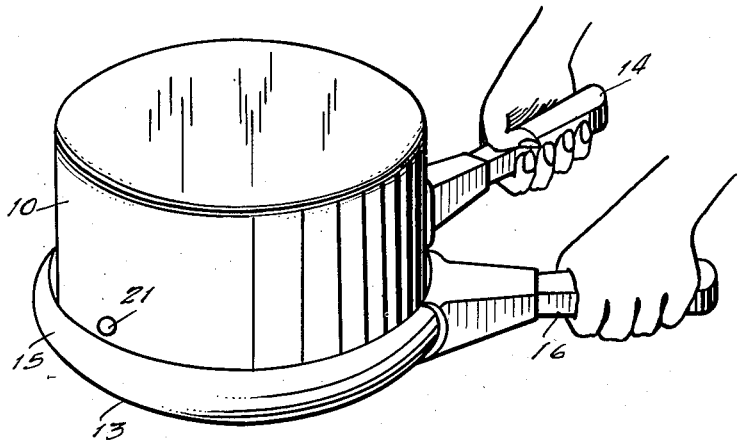
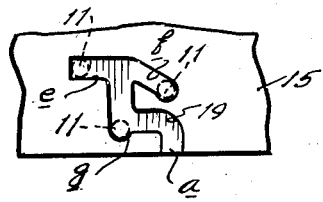
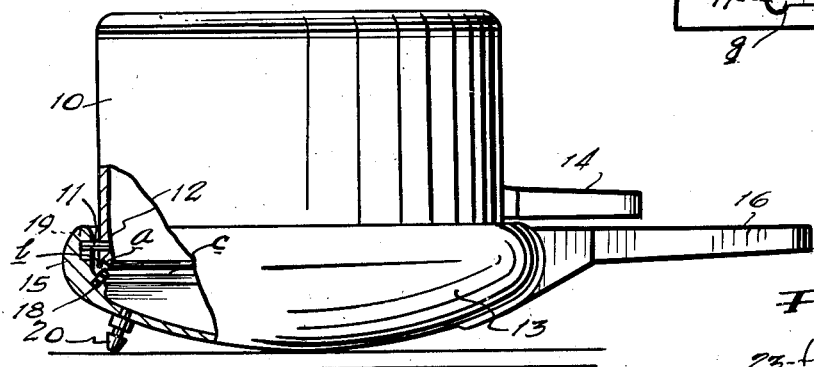
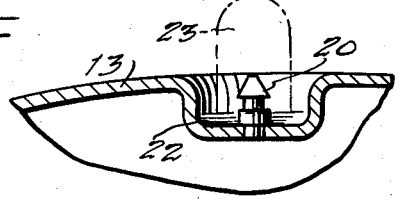
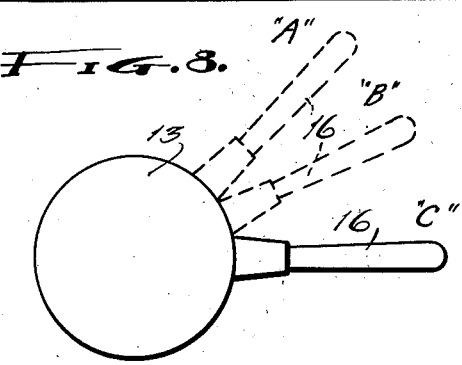
ROBERT J. PRATT
INVENTOR.
BY
ATTORNEY Patented Mar. 25, 1952

2,590,270

UNITED STATES PATENT OFFICE 2,590,270

COOKING VESSEL

Robert J. Pratt, Fort Worth, Tex., assignor of fifty per cent to Josephine Cocke, Fort Worth, Tex.

Application April 18, 1947, Serial No. 742,383

4 Claims. (Cl. 220—40)

This invention relates to cooking vessels, or the like, and it has particular reference to pressure cookers in which food stuffs are prepared and cooked under relatively high pressures to expedite the cooking processes and enhance the food value and flavor of the products, and the principal object of the invention resides in the provision of a combination of elements whereby the lid of the vessel can be so associated with the latter that, in addition to locking the same in position upon the vessel, it may be operated to different positions relative thereto to effect the drainage of liquids from the solid contents of the cooker or permit the discharge of steam or vapor pressures therefrom without endangering the operator and thus provide an arrangement whereby the cover of the vessel may be securely positioned against accidental or voluntary dislocation during cooking operations.

An object of the invention resides in the provision of a cooking vessel in which the cover therefor can be attached so that a minimum of effort is required in the application thereof as well as its manipulation in the draining of liquid contents from the solid contents of the vessel, when such operations are desired, and affording means whereby the cover can be automatically secured in semi-open positions when internal pressures are not required in the operation of the vessel and for the unattended drainage of liquid contents when such function is desirable.

A still further object of the invention is manifest in the provision of a cooking vessel in which is embodied certain safety features calculated to protect the operator against the hazards of scalding water or steam and provide means whereby the vessel can be conveniently handled with a minimum of effort and without injury to the vessel, or loss of the contents thereof, affording an arrangement whereby drainage of the liquid contents of the vessel from the solid contents thereof can be accomplished by simply inverting the same in the kitchen sink or upon an adjacent drain board where the draining operation can be accomplished unattended.

Broadly, the invention contemplates the provision of a simple and economical structure in which the cooking vessel can be readily adapted for either pressure cooking or as an ordinary stew pan in which the cover can be securely attached to the vessel during conventional boiling or stewing operations, allowing the discharge of steam or the boiling over of contents to occur, without creating a hazard to the operator or a material loss in the product being processed.

While the foregoing objects are paramount, other and lesser objects will become manifest as the description proceeds, taken in connection with the appended drawings wherein:

Figure 1 is a vertical cross-sectional illustration of the invention showing the cover in locked position upon the vessel when the device is utilized as a pressure cooker.

Figure 2 is a plan view of the vessel with the cover removed, illustrating the radially spaced lugs on the upper rim of the vessel by which the cover is secured thereto.

Figure 3 is a fragmentary cross-sectional illustration showing the relationship of the cover with the vessel, and illustrating the cover in raised position providing a spacing between the cover and the vessel, and further illustrating the safety plug in the wall of the vessel.

Figure 4 fragmentarily illustrates, in perspective, the internal rim of the cover showing the positions and form of the keeper slots defined in the cover rim.

Figure 5 is a perspective illustration showing the invention in operative position while draining the liquid contents therefrom.

Figure 6 shows the invention in elevation, arranged in inverted position on a kitchen drain board, or the like, a portion being cut away to illustrate the cover in open locked position to provide for the drainage of the liquid contents.

Figure 7 fragmentarily illustrates the inner rim of the cover showing one of the several slots defined therein and the different positions of the attaching lugs in the slot.

Figure 8 diagrammatically illustrates the invention in plan, showing, in dotted lines, the different positions of the handle and the several rotative positions of the cover with respect to the vessel, and Figure 9 fragmentarily illustrates, in cross-section, the preferred arrangement of the pressure-indicator valve set in the cover and illustrating, in broken lines, the weighted cover therefor.

In the preferred embodiment of the invention, as applied to a conventional type of cooking vessel 10, includes the provision of a plurality of spaced studs or stationary pins 11 arranged about and slightly below the upper rim 12 of the vessel 10, as illustrated in Figure 2. It is preferable that the pins 11 be of sufficient number and be so spaced as to properly retain the cover 13 thereof in operative position.

The upper rim 12 of the vessel 10 is formed with a bevelled seat $a$ which is inclined outwardly, terminating against a shoulder $b$, as illustrated in Figures 1, 3 and 6. It is desirable that the vessel 10 be die cast, of aluminum, or other suitable material, and have a handle 14 secured thereto and suitably spaced below the upper rim 12 to accommodate the depending flange 15 of the cover 13, as in Figure 1, the latter also having a handle 16 which, when the cover 13 is locked in position upon the vessel 10, is arranged immediately above and is in alignment with the handle 14 thereof, as in Figure 1.

The cover 13 is also preferably cast in the same material with the vessel 10 and the flange 15 thereof is thickened, as apparent in the cross-sectional illustrations shown in Figures 3 and 6, and an annular groove 17 is formed therein in which is arranged a sealing ring 18 whose exposed edge c engages the bevelled seat a about the upper rim 12 of the vessel 10 to create a pressure-tight compartment therein. The ring 18 is positioned angularly, in section, and internal pressures intensify the seal by urging the ring 18 outwardly against the shoulder b, as in Figure 1.

The inner surface of the flange 15 of the cover 13 has a plurality of spaced channels or recesses 19, as shown particularly in Figures 4 and 7, which register with and operatively receive the pins 11 projecting from the upper rim 12 of the vessel 10 and serve, in combination with these members, to lock the cover 13 to the vessel 10 to seal the latter or in spaced relation thereto, as in Figures 3 and 6, so that liquid contents of the vessel 10 can be drained therefrom without disturbing the solid contents thereof, or steam can be exhausted in boiling or stewing processes.

The pins 11 enter the channels 19 at d when the handle 16 is in the position A shown in the diagrammatic illustration in Figure 8. The handle 16 is then moved to the position B, the position of the pins 11 at this point being shown in dotted lines in Figure 7, whereupon the cover 13 will drop downwardly so that, by turning the handle 16 to the locked position C, shown in solid lines in Figure 8, the pins 11 will enter the substantially horizontal portions e of the channels 19, which are preferably slightly inclined upwardly, to urge the cover ring 18 securely against the seat a in the manner shown in Figure 1.

Downwardly inclined portions f extend oppositely from the portions e, terminating directly above the open ends d of the channels 19, so that the cover 13 is raised slightly out of contact with the vessel 10 when the handle 16 is moved back to the position A, a cam action being the result between the ends of the portions e and f of the recesses or channels 19. It will become apparent that, in this position, the cover 13 is in fixed relation with respect to the vessel 10 but spaced therefrom so that it can be supported on the cover 13, as in Figure 6. In this position the liquid contents can be drained unattended.

The lower ends g of the vertical portions of the channels 19 are indented to provide rests for the pins 11. This arrangement affords a means for securing the cover 13 to the vessel 10 so that the latter can be employed for boiling or stewing operations, as in ordinary vessel, permitting a limited vertical movement with respect thereto while incapable of voluntary detachment therefrom by the turbulence of the boiling products therein.

Thus, when the cover 13 is moved from its locked position, the handle 16 being in the position C in Figure 8, while excess pressure is built up in the vessel 10, injury will not result to the person handling or near the same. The steam or boiling contents of the vessel 10 is directed downwardly by the depending flange 15 of the cover 13 and the latter cannot be blown off and the operator injured. It is advisable, of course, to deplete the pressure through the gauge valve 20 in the cover 13 before opening the vessel 10 but hazards from burning or scalding are minimized by this securing feature.

It is also apparent that the positions of the handles 14 and 16 afford greater ease in handling the vessel 10, as in Figure 5, since the leverage provided by the separated handles aid in manipulating the vessel to different positions, as the inverted position illustrated in Figure 5, for draining the liquid contents from the solids without losing or dissipating the latter. Moreover, the food value and flavor of the contents may also be preserved by keeping the vessel covered at all times until the products are ready to be served.

A safety plug 21 is arranged in a wall of the vessel 10, preferably opposite the handle 14 thereof, and near the upper rim 12 so that the depending flange 15 of the cover 13 will overhang the same when the cover is in locked or sealed position as in Figure 1. With this arrangement when excessive pressure is built up within the vessel 10, sufficient to blow out the safety plug 21, the force of the discharge will be directed downwardly by the flange 15 instead of upwardly as in conventional structures.

The gauge valve 20 may be arranged in any desirable manner in the cover 13, as in the conventional arrangement illustrated in Figures 1 and 6. A modification of this arrangement is shown in Figure 9 in which the gauge valve 20 is situated in a well 22 formed in the cover 13. The valve 20 may conventionally be covered by a weight member 23, shown in dotted lines in Figure 9.

Manifestly, the structure herein shown and described is capable of considerable changes and modifications by persons skilled in the art without departing from the spirit and intent of the invention or the scope of the appended claims.

What is claimed is:

1. In a cooking vessel, in combination with a cover for said vessel having a depending flange, a plurality of spaced tortuous channels formed internally of said flange, each of said channels having a portion extending from the rim of said flange upwardly thereof and then at right angles thereto, thence upwardly to communicate, intermediate its ends, with a portion of said channel extending circumferentially of said flange, a plurality of pins arranged integrally of the upper outer rim of said vessel capable of engagement with said channels providing a detachable association between said cover and said vessel, whereby to lock said cover in sealed position on said vessel and secure the same in unsealed position with respect to said vessel.

2. In a cooking vessel, in combination with a cover for said vessel having a depending flange and spaced studs on said vessel for securing said cover thereto, a plurality of tortuous channels formed internally of said flange and registerable with said spaced studs providing an interlocking association between said cover and said vessel, each of said channels having a portion communicating with the rim of said flange and extending thereinto and connecting with a right angular portion extending circumferentially of said flange, a communicating portion of said channel connecting with another portion of said channel intermediate its ends also arranged circumferentially of said flange, the said channel being adapted to receive said studs, a handle on said vessel and a handle on said cover, each extending at right angles from said vessel and said cover, the said last named handle being movable with respect to said vessel handle to secure said cover to said vessel in at least three positions with respect thereto.

3. In a cooking vessel, in combination with a cover therefor having a depending flange, a plurality of spaced channels formed internally of said flange with angular conformations so that one of said channels communicates in the rim of said flange and extends upwardly therein to a right-angular channel, the latter having a vertical channel extending upwardly therefrom and communicating intermediate the ends of a channel arranged circumferentially of said flange, a plurality of pins arranged about the upper rim of said vessel and engageable with said channels to provide an interlocking association between said cover and said vessel, the said angular conformations of said channel providing means for adjustably securing said cover in a plurality of positions on said vessel against voluntary detachment therefrom while said vessel is in different positions, and a safety plug arranged in one wall of said vessel and normally covered by said flange when said cover is in sealed position.

4. In a cooking vessel, in combination with a cover therefor having a depending flange, a plurality of spaced studs arranged about the upper rim of said vessel, a series of channels formed internally of said flange and registerable with said studs, each of said channels comprising a portion extending from the rim of said flange inwardly thereof to connect with one end of a right-angular portion and another vertical portion extending farther inwardly of said flange from the opposite end of said right-angular portion communicating with a circumferentially arranged portion intermediate its ends, the said channels capable of engaging said studs in one position of said cover to seal said vessel and in another position of said cover to retain the latter in raised position in rigid association with said vessel, and means forming parts of said channels receiving said studs for preventing detachment of said cover from said vessel while said cover is capable of limited vertical movement with respect to said vessel.

ROBERT J. PRATT.

REFERENCES CITED

The following references are of record in the file of this patent:

UNITED STATES PATENTS

| Number | Name | Date |
|---|---|---|
| 623,957 | Hamill | Apr. 25, 1899 |
| 1,211,173 | King | Jan. 2, 1917 |
| 1,409,902 | Ausen | Mar. 21, 1922 |
| 2,177,123 | Wittenberg | Oct. 24, 1939 |
| 2,399,115 | Hansen et al. | Apr. 23, 1946 |
| 2,480,578 | Hodges | Aug. 30, 1949 |

FOREIGN PATENTS

| Number | Country | Date |
|---|---|---|
| 636,625 | France | Apr. 13, 1928 |